3,830,935
METHOD FOR THE CONTROL OF THE DOUGLAS FIR BEETLE
Julius A. Rudinsky, % Department of Entomology, Oregon State University, Corvallis, Oreg. 97331
No Drawing. Filed July 24, 1972, Ser. No. 274,708
Int. Cl. A01n 9/24
U.S. Cl. 424—331    2 Claims

ABSTRACT OF THE DISCLOSURE

Method for the control of the Douglas fir beetle using 3-methyl-2-cyclohexen-1-one.

---

This invention relates to the control of the Douglas fir beetle using 3-methyl-2-cyclohexene-1-one.

The Douglas fir beetle, *Dendroctonus pseudotsugae* Hopkins, is a very destructive beetle of Douglas fir trees. The Douglas fir beetle is a member of the order Coleoptera, family Scolytidae. Destruction of Douglas fir trees by this beetle is caused by the reproduction cycle of the beetle. Initially, the adult female bores into the bark of the fir tree. During the boring or tunneling process, the female produces a substance known as "frass" which attracts other adult beetles (male and female) to the tree. A male beetle enters the tunnel where mating occurs and the eggs are subsequently deposited. When the eggs mature, the new larvae feed on the cambium layer of the tree creating a series of tunnels and later emerge as adults. The Douglas fir beetle has one generation per year with the young wintering under the bark and emerging as adults in the spring. Depending upon the number of beetles attacking the tree, the tree may be sufficiently weakened to die resulting in great economic and ecological loss.

Douglas fir beetles prefer windthrown or fallen fir trees as hosts as compared to standing, healthy trees. When very severe winters occur resulting in more downed trees than normal, the fir beetle is favored and reproduction increases dramatically. Unless the downed, host trees are removed during the summer or fall, the following spring, the increased population of adult beetles attack standing, healthy trees in sufficient number to kill or seriously weaken the tree. Aside from the inefficiency and great expense of removing and destroying the downed, host trees, it is oftentimes practically impossible to remove and destroy the downed trees because of the very remote location of many windfalls.

It has been discovered that the aforementioned disadvantages in the control of Douglas fir beetle populations can be effectively and economically overcome by the use of 3-methyl-2-cyclohexen-1-one (hereinafter referred to as "MCH"). Without any intention of being bound by theory, MCH appears to act as an anti-attractant to the adult beetle. The presence of a very small amount of MCH on or in proximity to fir trees such as the favored, fallen host trees repels flying Douglas fir beetles. MCH is sufficiently effective so as to repel adult beetles even though frass, the natural attractant produced by the female, may already be present. Consequently, the reproduction cycle is inhibited. As a further consequence, the adult beetles are, in effect, dispersed and prevented from building up abnormal high population concentrations that are sufficient to kill standing trees. By preventing abnormal growth of and concentration of populations of the beetles, the natural predators are better able to control the beetle population. Additionally, as long as there is not an abnormal increase in and concentration of population, the standing trees are able to tolerate the presence of the Douglas fir beetle without serious harm.

In the practice of the present invention, MCH can be applied using a suitable liquid or solid inert carrier. Suitable solid carriers include inorganic and organic solids such as the silicates and cellulosic materials in the form of dusts or granules, e.g., diatomaceous earth, silica, talc, vermiculite, sawdust, synthetic and natural resins, and the like. Suitable inert liquid carriers include aliphatic alcohols, ethers, mineral and vegetable oils, and the like. Film forming and sticky or adhesive agents such as polyvinyl alcohol, polyvinyl pyrrolidone and copolymers, Stickem Special, and the like can be used as the carrier or a carrier additive. Impregnation and encapsulation of MCH using synthetic polymers can be used also as a method of distribution. Additives such as stabilizers, anti-oxidants, and wetting agents can be included. The amount of MCH in a particular formulation can vary widely depending upon such factors as density of distribution, climatic conditions and method of application. The most advantageous formulation and concentration of MCH for a particular area to be treated is readily determinable by those of ordinary skill in the art using routine experimentation. For example, in the case of windthrown or fallen trees in which hand application is used, a formulation applied every several feet, e.g. 20–40 feet; to the tree or in close proximity thereto which releases from about 0.25 mg. to 1.0 mg. of MCH per day during the flight of the beetles will provide effective control.

The following tests demonstrate the effectiveness of MCH. The laboratory method which used a Walkway Olfactometer is described in *J. Econ. Ent.* 64, 970 (1971). In the test, MCH was tested against frass, the natural attractant, in a female gallery in a log. Each male beetle was tested separately. Released about five inches away from the entry to the gallery and guided by two glass rods, the male either walked past the entry and frass or was arrested there. MCH was diluted to 1.0% concentration in 95% ethanol and 8–10 drops sprinkled over the frass. Also MCH in three concentations was tested against synthetic attractants FTR and FTC, consisting of frontalin, *trans*-verbenol and either resin or camphene diluted in ethanol.

| Treatment | Response of 60 male beetles | |
|---|---|---|
|  | Arrested | Passed |
| Control (frass alone) | 60 | 0 |
| 1.0% MCH plus frass | 0 | 60 |
| 0.001% MCH plus FTR | 49 | 11 |
| 0.01% MCH plus FTR | a 38 | a 22 |
| 1.0% MCH plus FTR | 0 | 60 |
| 0.001% MCH plus FTC | 26 | 34 |
| 0.01% MCH plus FTC | a 19 | a 41 |
| 1.0% MCH plus FTC | 0 | 60 | a The change in response from the immediately preceding figure in each column is significant at the 99% confidence level.

In field tests, MCH was tested against the natural attractant in female-infested logs and against the synthetic attractant FAC, frontalin, alpha-pinene, and camphene. At 10% concentration MCH was diluted in 100% ethanol. The delivery system for all substances is described in Rudinsky et al. *Can. Etomol.* 104, 815 (1972). For each treatment there were two stations 150 feet apart and three day-long tests.

| Treatment | Response | | |
|---|---|---|---|
|  | Male | Female | Total |
| Control (female log alone) | 635 | 413 | 1,048 |
| Control (MCH alone) | 0 | 0 | 0 |
| 5 mg. MCH plus female log | 2 | 2 | 4 |

Without any intention of being bound by theory, although control of the Douglas fir beetle in accordance with the present invention has been described herein as an anti-attractant property of MCH, the mechanism of action is not clearly understood. A second possibility for an explanation of the mode of action is that MCH has the property of masking or neutralizing the natural attractant, frass, upon which the fir beetle depends for orientation in mating. Another possibility for mode of action is that MCH disrupts mating communication between the beetles due to permeation of the air with MCH which has been previously reported as a principal component of the pheromone of the Douglas fir beetle. Kinzer et al., *J. Econ. Ent.*, 64, 970 (1971). The disruption of mating by use of insect pheromone has been reported by Gaston et al., Nature 1155 (March 1967). Aside from the mode of action, as described herein, it has been discovered that the use of MCH provides an effective and ecomonic means of controlling Douglas fir beetle populations.

What is claimed is:

1. A method of protecting Douglas fir trees from destructive attack by the bark beetle, *Dendroctonus pseudotsugae*, which comprises placing, on or in proximity to said trees, an effective repellant amount of 3-methyl-2-cyclohexen-1-one, whereby the adult beetles are dispersed and prevented from building up a concentration sufficient to destructively attack the trees.

2. The method according to Claim 1 wherein said 3-methyl-2-cyclohexen-1-one is placed on or in proximity to wind-thrown or fallen trees.

References Cited

J. Econ. Entomol. *64(4)* 970–971 (1971) Kinzer et al. Bark Beetle Attractants: 3-methyl-2-cyclohexen-1-one.

ALBERT T. MEYERS, Primary Examiner

D. W. ROBINSON, Assistant Examiner